US012683096B2

(12) United States Patent
Plechinger et al.

(10) Patent No.: US 12,683,096 B2
(45) Date of Patent: Jul. 14, 2026

(54) DEVICE FOR LOCKING AN ASSEMBLY, AND SYSTEM FOR LOCKING DIFFERENT ASSEMBLIES

(71) Applicant: Siemens Aktiengesellschaft, Munich (DE)

(72) Inventors: Ekkehard Plechinger, Röckersbühl (DE); Alexander Fanderl, Riedenburg (DE)

(73) Assignee: Siemens Aktiengesellschaft, Munich (DE)

( * ) Notice: Subject to any disclaimer, the term of this patent is extended or adjusted under 35 U.S.C. 154(b) by 214 days.

(21) Appl. No.: 18/554,668

(22) PCT Filed: Sep. 23, 2021

(86) PCT No.: PCT/EP2021/076170
§ 371 (c)(1),
(2) Date: Oct. 10, 2023

(87) PCT Pub. No.: WO2022/214204
PCT Pub. Date: Oct. 13, 2022

(65) Prior Publication Data

US 2024/0371580 A1 Nov. 7, 2024

(30) Foreign Application Priority Data

Apr. 8, 2021 (WO) ................. PCT/EP2021/059226

(51) Int. Cl.
*H01H 9/28* (2006.01)

(52) U.S. Cl.
CPC .................................. *H01H 9/286* (2013.01)

(58) Field of Classification Search
CPC ........ H01H 9/286; H01H 71/10; H01H 71/14; H01H 71/145; H01H 37/32; H01H 37/323; H01H 61/0107; H01H 2061/0107; H01H 2061/0115; H01H 9/28; H01H 71/16; H01H 71/164; H01H 71/18; H01H 2085/0004; H01H 2300/034
USPC ............................................. 200/237, 43.11
See application file for complete search history.

(56) References Cited

U.S. PATENT DOCUMENTS

| | | | | |
|---|---|---|---|---|
| 5,043,687 | A | 8/1991 | Gibson | |
| 8,471,659 | B1 | 6/2013 | Flegel | |
| 9,734,974 | B2 * | 8/2017 | Colombo .............. | H01H 71/66 |
| 11,052,526 | B2 | 7/2021 | Brinkmann et al. | |
| 2006/0070861 | A1 | 4/2006 | Bogdon et al. | |
| 2014/0060036 | A1 | 3/2014 | Gao et al. | |

(Continued)

FOREIGN PATENT DOCUMENTS

| | | | |
|---|---|---|---|
| CN | 112038192 | A | 12/2020 |
| CN | 112071716 | A | 12/2020 |

(Continued)

*Primary Examiner* — Anthony R Jimenez
(74) *Attorney, Agent, or Firm* — Laurence A. Greenberg; Werner H. Stemer; Ralph E. Locher

(57) ABSTRACT

A device for locking an assembly includes an actuator having a first shape and a second shape, and a locking element. When the actuator has its first shape it moves the locking element into a blocking position in order to block the assembly, and when the actuator has its second shape, it moves the locking element into a release position in order to release the assembly. A system for locking different assemblies is also provided.

15 Claims, 12 Drawing Sheets

(56) References Cited

U.S. PATENT DOCUMENTS

| | | | | |
|---|---|---|---|---|
| 2014/0130491 | A1 | 5/2014 | Gandhi et al. | |
| 2015/0152853 | A1 | 6/2015 | Sicre | |
| 2018/0033568 | A1 | 2/2018 | Falk et al. | |
| 2020/0051423 | A1 * | 2/2020 | Kevelos | G08B 5/36 |

FOREIGN PATENT DOCUMENTS

| | | | |
|---|---|---|---|
| DE | 102010025142 | A1 | 12/2011 |
| DE | 102015226440 | A1 | 6/2017 |
| EP | 3089186 | A1 | 11/2016 |
| WO | 2012013180 | A2 | 2/2012 |
| WO | 2013182791 | A1 | 12/2013 |
| WO | WO 2020200526 | A1 | 10/2020 |

* cited by examiner

DEVICE FOR LOCKING AN ASSEMBLY, AND SYSTEM FOR LOCKING DIFFERENT ASSEMBLIES

FIELD AND BACKGROUND OF THE INVENTION

The invention relates to a device for locking an assembly and to a system for locking different assemblies.

The main task of modern circuit breakers is to connect and disconnect current and voltage to/from a section of an installation, and to automatically trip the circuit breaker in the event of an overload or a short circuit.

Various front-side or rear-side locking assemblies are known in order to block electrical switches from being connected or disconnected unintentionally or without authorization or in order to mutually lock two or more electrical switches. For example, padlock locking arrangements or Bowden cable locking arrangements can be provided for front-side locking. Various rear-side locking assemblies are also known, such as bar locking arrangements or backlock locking arrangements for example.

Furthermore, provision can be made to mutually lock several electrical switches or accessories. These are typically internal locking assemblies with cylinder locks. These cylinder lock assemblies can be arranged, for example, in a pocket of the housing of an electrical switch in order to lock a latching mechanism. Similarly, internal locking assemblies are used in the case of inserts, where they can block or release, for example, the crank drive for drawing in or ejecting the electrical switch.

Furthermore, internal locking assemblies can also be provided in the case of motor drives in order to lock or unlock the drive using a cylinder lock. Furthermore, internal locking assemblies in the form of cylinder locks can also be used in rotary drives for blocking or for releasing a rotary handle. This is also possible in the case of door coupling rotary drives.

Previous solutions for mutual locking operate in such a way that an electrical switch can be connected only when the movement sequence of the other switch, or in case of more than two switches all of the other switches, is mechanically blocked. In the case of cylinder lock assemblies, a specific supplied receiving insert for mutual locking operations ensures that the key of the cylinder lock cannot be removed in the blocked condition. The entire installation has only one key, which fits all the cylinder locks. The corresponding assembly can be operated only where this one key is inserted. The other assemblies, which do not have this key, cannot be operated.

SUMMARY OF THE INVENTION

The object of the invention is to provide a locking device and a system for locking different assemblies, the device and system reducing the above-described complexity and variety and being compact and able to function with a simple mechanical and electrical construction.

According to the invention, this object is achieved by a device for locking an assembly. Advantageous refinements of the device according to the invention are specified in the dependent claims. The object is also achieved according to the invention by the system for locking different assemblies. Advantageous refinements of the system according to the invention are specified in the dependent claims.

The device for locking an assembly comprises an actuator, with a first shape and a second shape, and a locking element, wherein the actuator, when it is in its first shape, moves the locking element into a blocking position in order to block the assembly, wherein the actuator, when it is in its second shape, moves the locking element into a release position in order to release the assembly.

It is advantageous here for the locking of an assembly according to the invention to represent a product enhancement of the electromechanical locking assemblies. Reduction and simplification of the accessory portfolio is rendered possible, for example complicated locking arrangements such as Bowden cable locking arrangements or rear-side locking arrangements can be dispensed with. Front-side, rear-side or internal locking arrangements can be combined as desired. All electrical switches and locking accessories can be mutually locked across sizes. It is also possible to mutually lock circuit breakers (MCCB) and miniature circuit breakers (MCB) for the first time using the invention.

Mutual locking arrangements are no longer linked to a mechanism and can therefore be constructed independently of their location. Furthermore, the locking arrangement according to the invention can be operated or controlled from a remote control center. Similarly, the locking state of the device according to the invention can be read electronically in order to lock an assembly. The mechanical locking can be read and controlled by means of software or by radio or the Internet. As a result, extremely complex mechanical locking systems and strategies can be implemented entirely independently of their location and distributed across the entire world.

In one refinement of the device according to the invention, the actuator is a shape-memory alloy actuator, a lifting magnet, a rotary magnet, a stepper motor or a linear unit.

In one refinement of the device according to the invention, the device locks an internal or an external assembly of this electrical switch.

In a further refinement of the device according to the invention, the assembly is a handle of an electrical switch, a switching shaft of an electrical switch, a latching mechanism inside an electrical switch, a crank drive inside an insert for an electrical switch, a drive inside a motor drive or a rotary handle inside a rotary drive or inside a door coupling rotary drive.

In one refinement, the actuator is energized by connection cables when it is in its first shape, and the actuator is not energized when it is in its second shape, or vice versa.

In a further refinement, the locking element is designed as a locking pin which, in manner mounted in a guide, can be moved between the blocking position and the release position.

The locking pin can perform a linear movement in the guide between the blocking position as the extended locking pin and the release position as the retracted locking pin. Furthermore, the locking pin can be moved against the force of a spring by the actuator.

The object according to the invention is also achieved by the system for locking different assemblies, wherein the system comprises at least two devices according to the invention and one control unit, wherein the actuators of the devices are actuated by means of the control unit and the assemblies are blocked or released in this way.

In one refinement of the system according to the invention, the different assemblies are of the same type. The different assemblies can be handles of electrical switches.

In a further refinement of the system according to the invention, in each case only one of the at least two devices can be released and at the same time the rest of the devices are blocked.

In one refinement, the control unit is designed as a selector switch. As an alternative, the control unit can be designed as an electronic controller. This electronic controller can be operated remotely.

The above-described properties, features and advantages of this invention, and the way in which they are achieved, will become clearer and more readily comprehensible in conjunction with the following description of the embodiments, which are explained in more detail in conjunction with the figures.

DETAILED DESCRIPTION OF THE INVENTION

Figure 1A:
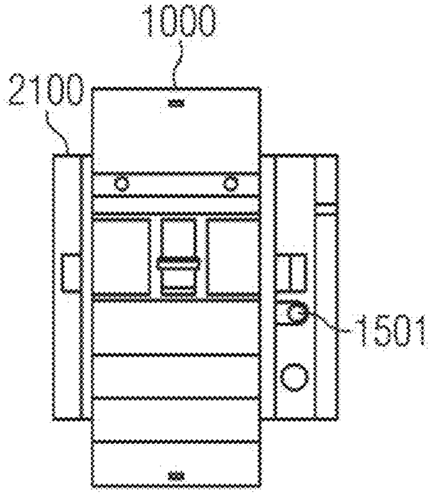
FIGS. 1A, 1B, 1C, 1C', 1D and 1D': show typical internal locks.

FIG. 1A shows an insert 2100 having a crank drive 1501. An electrical switch 1000 is drawn into the insert 2100. The electrical switch 1000 can be ejected or drawn in with the aid of the crank mechanism 1501.

Figure 1B:
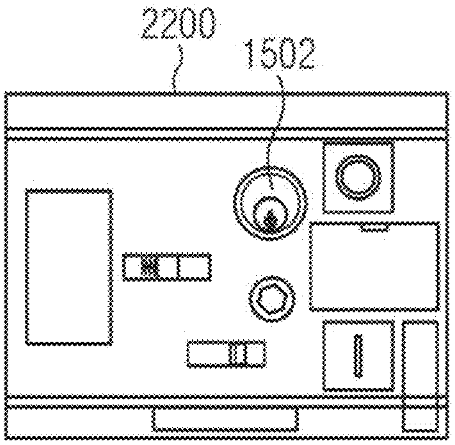

FIG. 1B shows a motor drive 2200, which contains a drive 1502. The motor drive 2200 can contain an energy store and it generally serves to trip an electrical switch 1000.

Figure 1C:
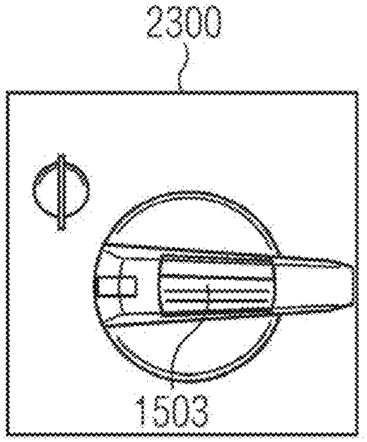
Figure 1C:
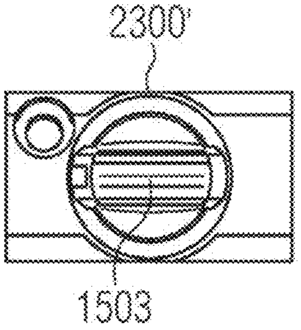
Figure 1D:
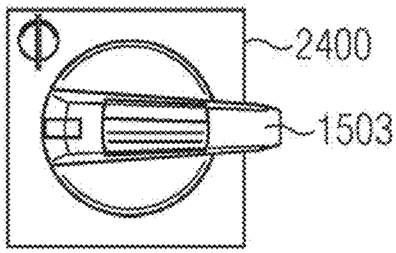
Figure 1D:
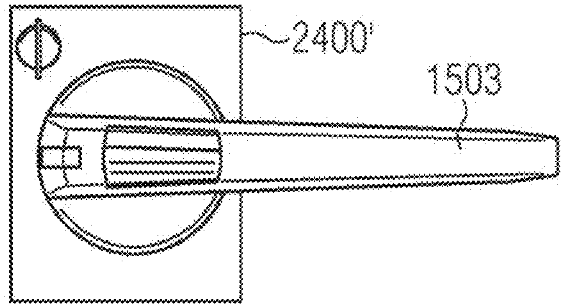

FIGS. 1C and 1C' show a rotary drive 2300 having a rotary handle 1503 and a further rotary drive 2300' likewise with a rotary handle 1503. The rotational movement of the rotary handle 1503 is converted into a linear movement of a handle of an electrical switch 1000 by means of a mechanism. FIGS. 1D and 1D' show door coupling rotary drives 2400; 2400', which can switch an electrical switch 1000 remotely from a door by means of a rotary handle 1503.

Figure 2A:
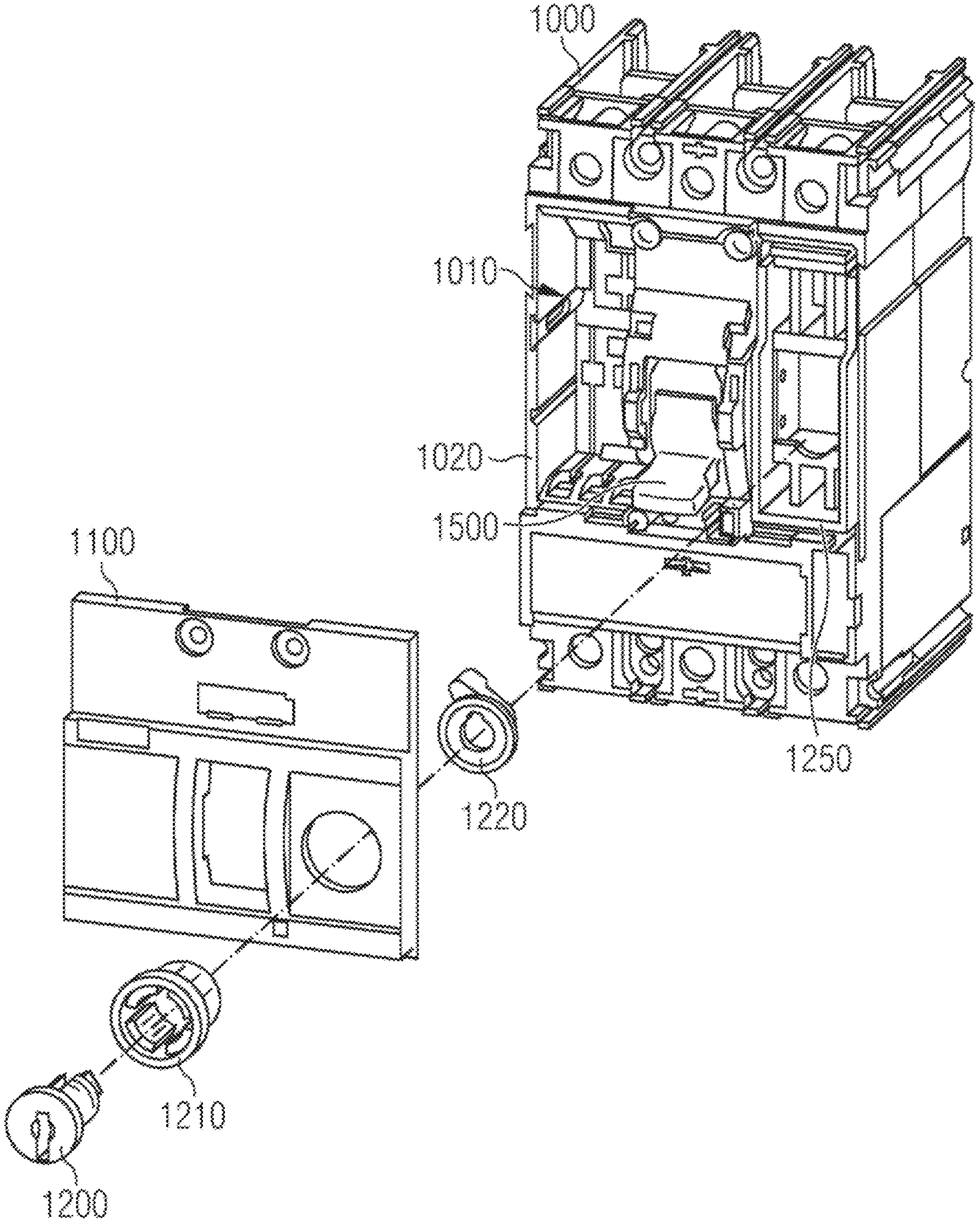
FIGS. 2A, 2B: show typical internal locks of an electrical switch and a device according to the invention for internally locking an electrical switch.

FIG. 2A shows an electrical switch 1000 having a housing 1020 and a latching mechanism 1500. The housing comprises a cover 1100 which, when it is removed, releases pockets 1010 into which accessories can be installed. For example, the accessory 1250 is inserted into the electrical switch 1000. This accessory comprises a cylinder lock 1200, which can block or release the latching mechanism 1500 via an adapter 1210 and a locking bolt 1220.

Figure 2B:
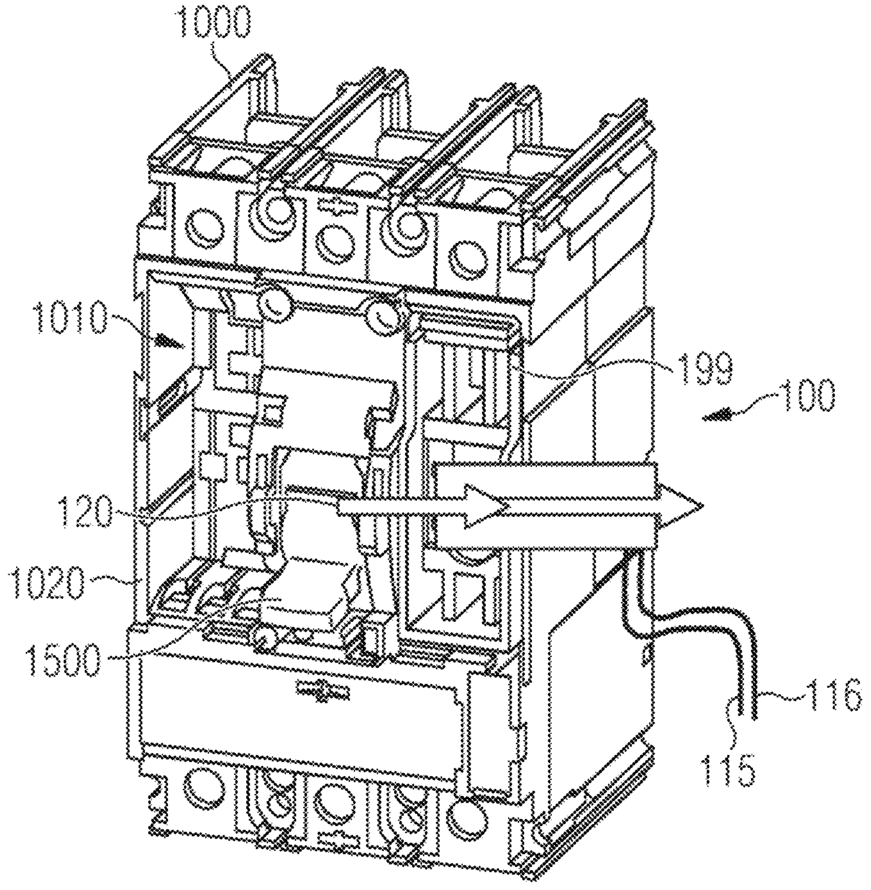

FIG. 2B shows the electrical switch having a device 100 according to the invention in order to lock an assembly 1500, which is the latching mechanism here.

Figure 7A:
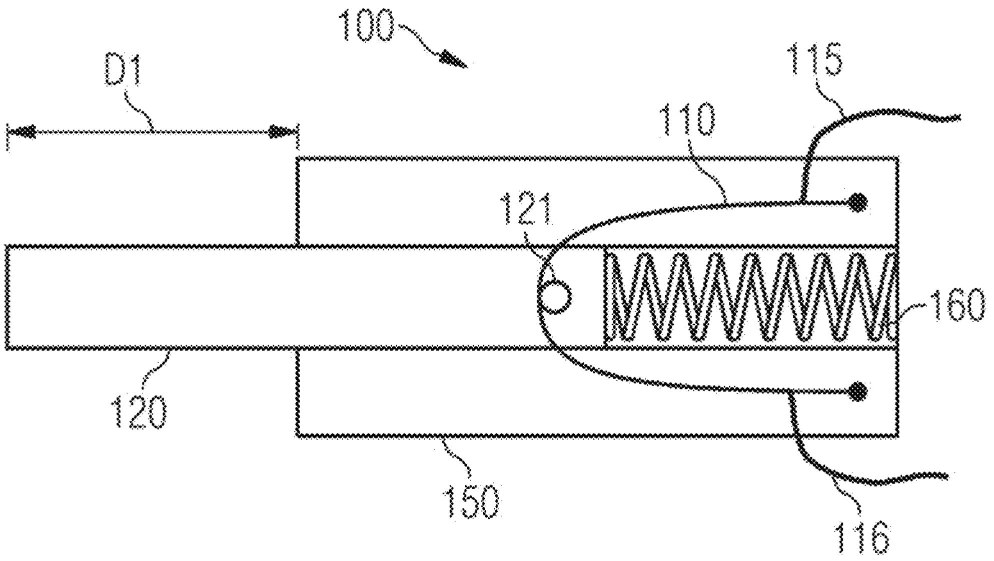
FIGS. 7A, 7B: show an actuator, a locking pin in a guide, and a spring for an electrical switch that is blocked as standard.
Figure 7B:
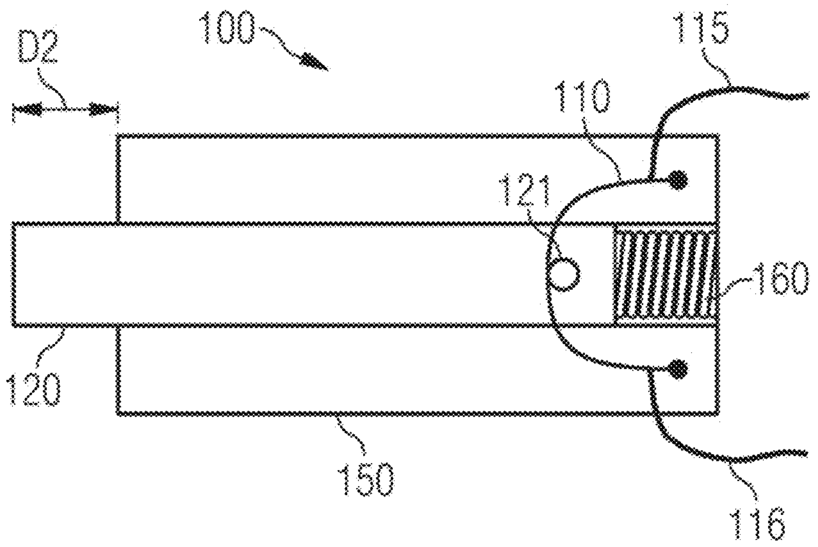

FIGS. 7A and 7B show this device 100 according to the invention in more detail. The device 100 comprises an actuator 110, with a first shape and a second shape, and a locking element 120. In accordance with the illustration in FIG. 7A, this locking element 120 projects out of a guide 150 by way of a length D1. FIG. 7A shows the device 100 in the blocking position in order to block the latching mechanism 1500 of the electrical switch 1000. The actuator 110 is in its first shape and therefore the locking element 120 is in the blocking position.

The locking element 120 is pushed to the left in the direction of the blocking position by a spring 160 in accordance with the illustration of FIG. 7A. A holding element 121 such as a pin located at the locking element 120 holds the actuator 110.

The actuator 110 can assume a second shape, as is shown in FIG. 7B. The locking element 120 is pulled to the right, against the force of the spring 160, by the actuator 110 in accordance with the illustration in FIG. 7B. The locking element 120 is in a release position in order to release the latching mechanism 1500 of the electrical switch 1000. A change in the state of the latching mechanism 1500 is possible owing to the release position. The actuator 110 has pulled the locking element 120 to the right, so that the locking element 120 projects out of the guide 150 only by way of the length D2, which is shorter than the length D1.

The actuator 110 can be a shape-memory alloy actuator, a lifting magnet, a rotary magnet, a stepper motor or a linear unit.

The actuator 110 according to FIGS. 7A and 7B is a shape-memory alloy actuator, which can assume a first shape and a second shape. Shape-memory alloys have the property that they remember their original shape under specific, relatively high temperatures. As a result, it is possible to construct shape-memory alloy actuators which are forced into a different condition or length at a low temperature. If the actuators are heated to this specific, relatively high temperature, which is set by the alloy components, the actuators suddenly assume their learnt shape. The shape-memory alloys can be heated by means of a heating element via the surroundings, which means indirect heating, or by way of current flowing through the shape-memory alloy itself, this corresponding to direct heating.

Shape-memory alloy actuators can be designed as a wire which contracts under a relatively high temperature, as a metal strip which bends under the relatively high temperature, as a cuboid which changes volume under the relatively high temperature, or as a geometry of any desired shape which fits in an optimum manner in the available installation space and which changes its extent or its volume in a specific, desired direction at the relatively high temperature.

In accordance with FIGS. 7A and 7B, the actuator 110 is designed as a wire. In its first shape as in FIG. 7A, the wire is longer than in its second shape in accordance with FIG. 7B.

In order to heat the actuator 110, connection cables 115; 116 are provided, which allow the actuator 110 to be energized. For example, the actuator 110 cannot be energized by the connection cables 115; 116 in its first shape and can be energized by the connection cables 115; 116 in its second shape, as shown in FIGS. 7A and 7B. An opposite procedure is also possible, in which the actuator 110 is energized in its first shape and is not energized in its second shape.

The energization directly heats the actuator 110, and it is also possible for the actuator 110 to be indirectly heated by a heating element, which is supplied with current by means of power cables 115; 116.

The locking element 120 can be designed as a locking pin, which is mounted in a guide 150 and can be moved between the blocking position and the release position, as is shown in FIGS. 7A and 7B. The locking pin performs a linear movement in the guide 150 between the blocking position as the extended locking pin as in FIG. 7A and the release position as the retracted locking pin as in FIG. 7B.

Figure 8A:
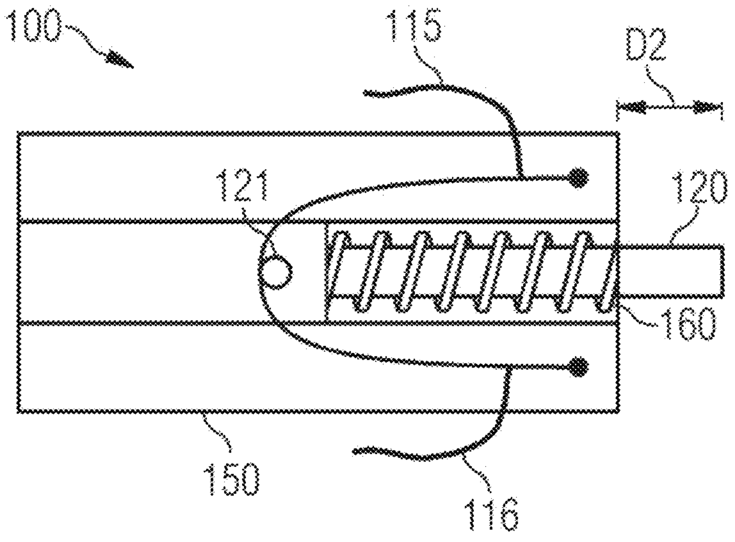
FIGS. 8A, 8B: show an actuator, a locking pin in a guide and a spring for an electrical switch that is released as standard.
Figure 8B:
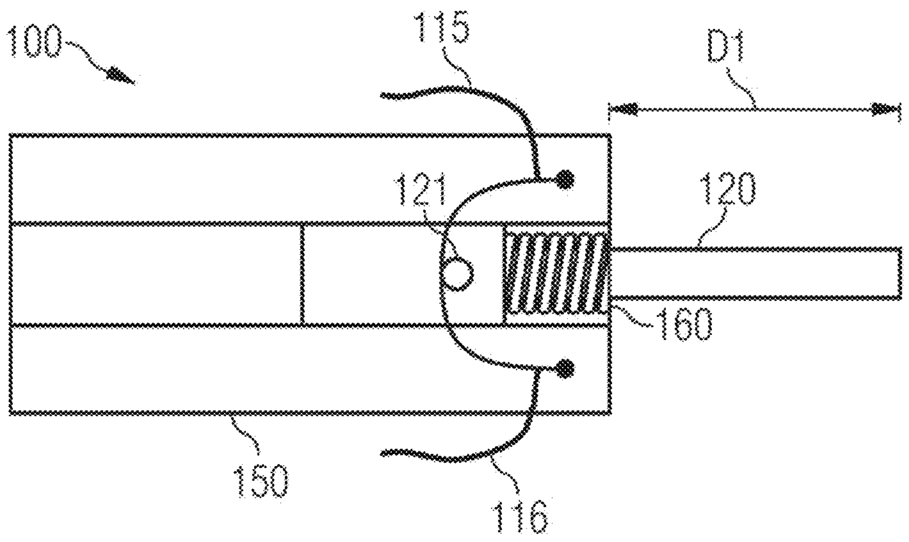

FIGS. 8A and 8B show an alternative embodiment of the device 100 according to the invention. When the actuator 110 is in its first shape in accordance with FIG. 8A, the locking element 120 projects out of the guide 150 by way of a length D2 owing to the spring 160. If the actuator 110 now changes from the first shape to the second shape in accordance with FIG. 8B, the actuator 110 is shortened and the locking element 120 is moved to the right against the force of the spring 160 in accordance with the illustration in FIGS. 8A and 8B. The locking element 120 now has a projecting length D1 and can move, for example, into the operating path of the latching mechanism 1500 of an electrical switch 1000 and block this operating path. The length D1 is greater than the length D2.

FIG. 2B shows an electrical switch 1000 having a housing 1020 with pockets 1010 and the device 100 according to the invention, wherein a latching mechanism 1500 is arranged inside the electrical switch 1000 in order to change the state of the electrical switch, wherein the device 100 is installed in the pocket 1010 in the housing 1020 next to the latching mechanism 1500 inside the electrical switch 1000, wherein the latching mechanism 1500 is blocked by the locking element 120 in the blocking position and the electrical switch 1000 is locked in this way, and wherein the latching mechanism 1500 is released by the locking element 120 in the release position and a change in the state of the electrical switch 1000 is possible in this way.

Figure 3A:
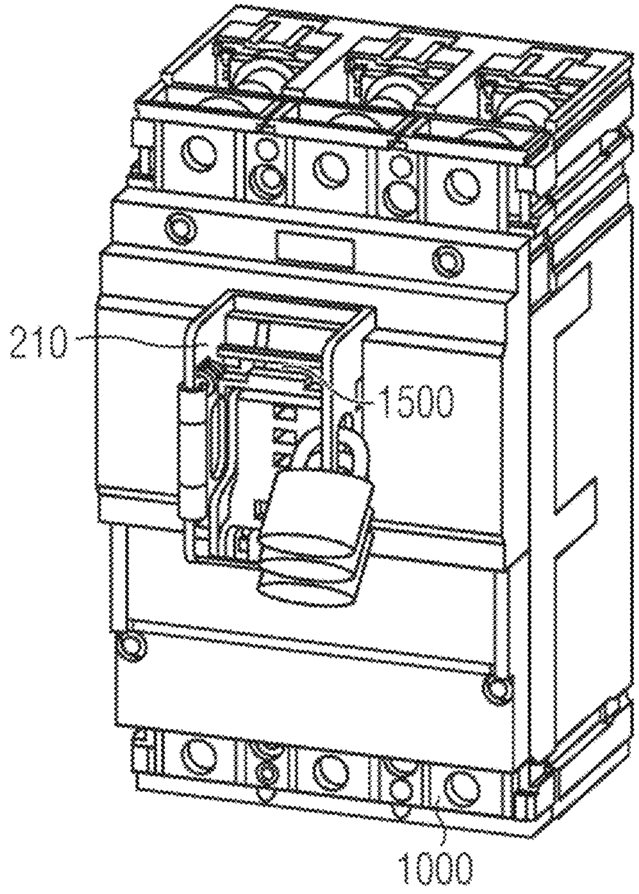
FIGS. 3A, 3B, 3C, 3D: show a typical front-side or rear-side lock of electrical switches.

FIG. 3A shows an electrical switch 1000 with a padlock locking arrangement 210 attached. The padlock locking arrangement 210 is placed around the handle 1500 of the electrical switch 1000 and locked by means of padlocks, so that the handle 1500 can no longer be operated and is blocked in its current position.

Figure 3B:
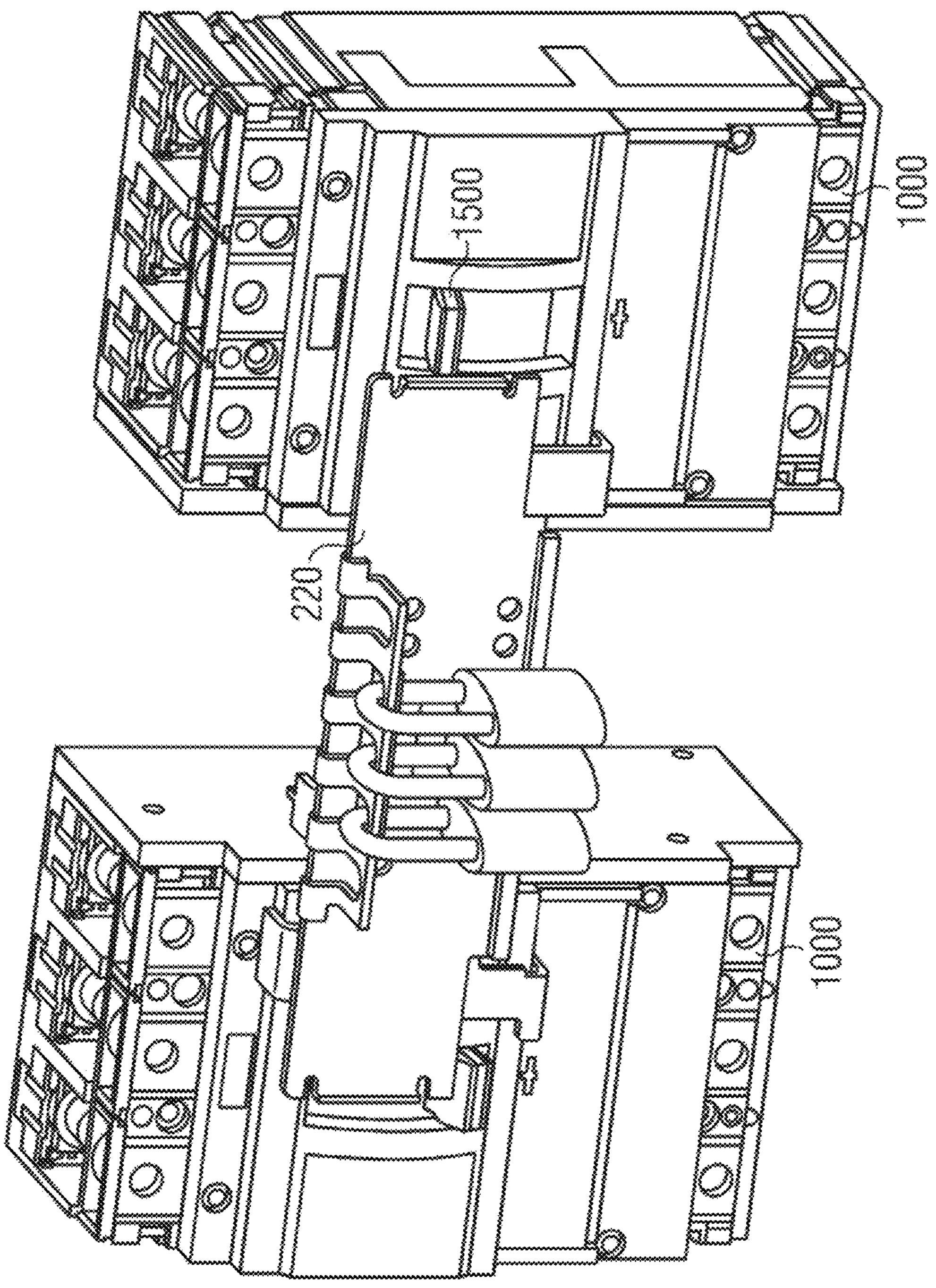

FIG. 3B shows a sliding locking arrangement 220 having two electrical switches 1000. The sliding locking arrangement 220 ensures that only one of the two electrical switches 1000 can be operated at any time.

Figure 3C:
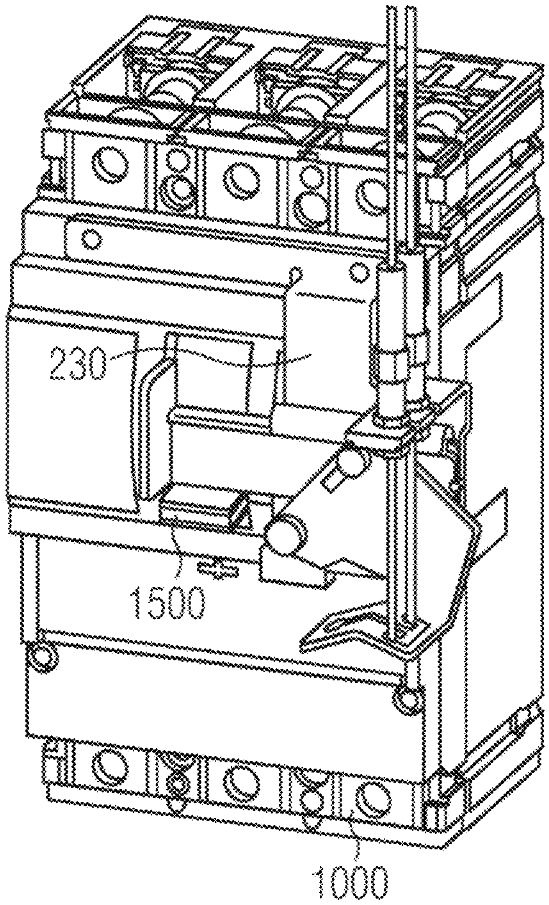

FIG. 3C shows a Bowden cable locking arrangement 230 fitted to an electrical switch 1000. The Bowden cable locking arrangement 230 can ensure that, for example, one or more further electrical switches 1000 can be switched only when the handle/handles 1500 thereof is/are in a specific position. The Bowden cables transfer the switch positions of the electrical switches 1000 and thus ensure that the handles 1500 of the electrical switches 1000 can be operated only in specific configurations.

Figure 3D:
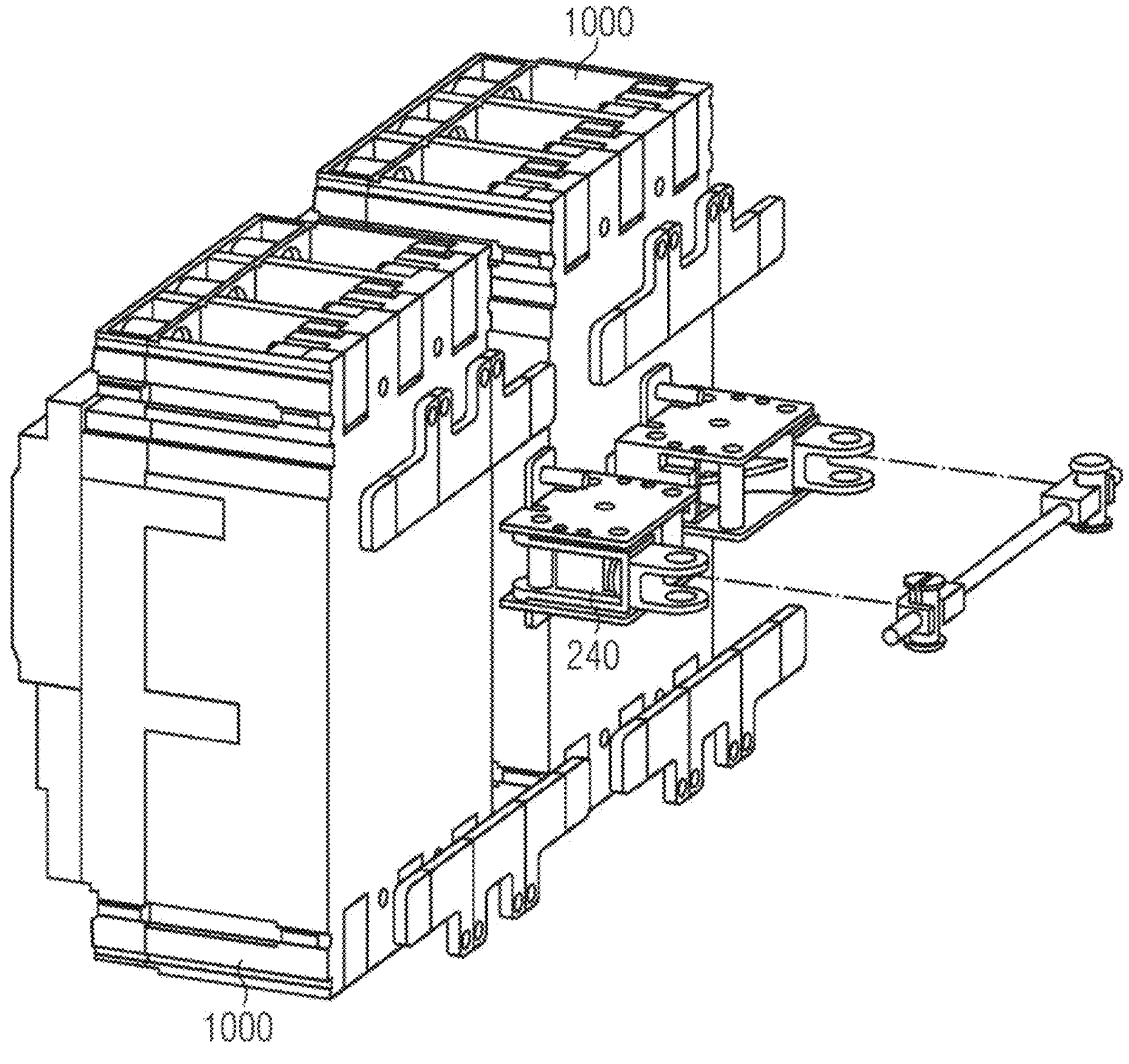

FIG. 3D shows a rear-side locking assembly as a rod locking arrangement 240. Owing to this rod locking arrangement 240, the switching shaft of the electrical switch 1000 can be blocked from the rear side. For example, this can also ensure that adjacent electrical switches 1000 can be switched only in accordance with a specific switching pattern. As in the case of the sliding locking arrangement 220 in FIG. 3B or in the case of the Bowden cable locking arrangement 230 in FIG. 3C, it is possible to ensure that only one of the two electrical switches 1000 can be connected or disconnected.

Figure 4B:
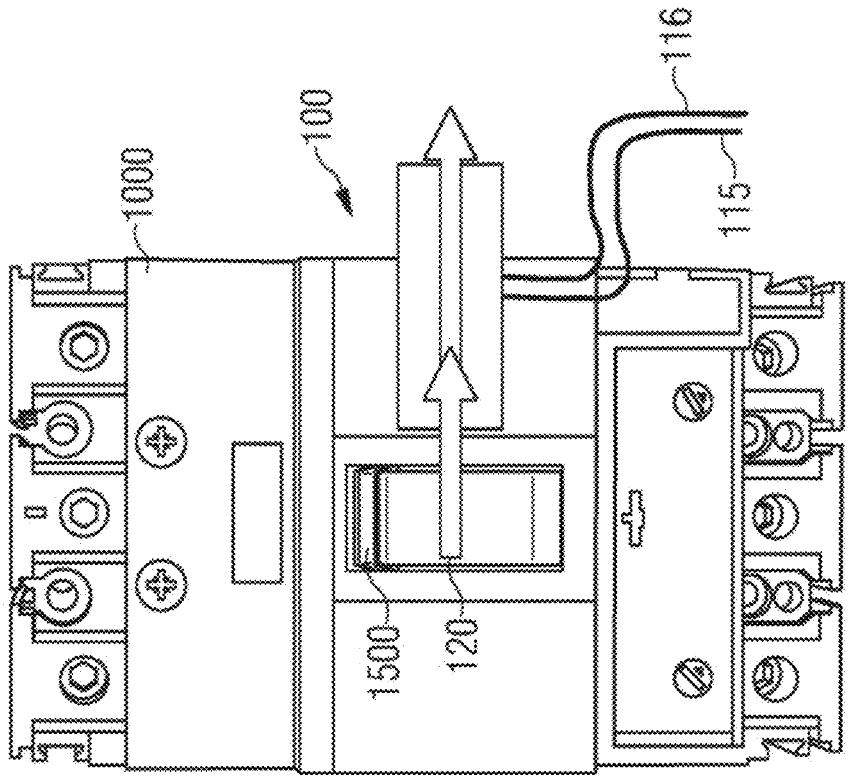
FIGS. 4A, 4B: show a device according to the invention for locking an electrical switch in the OFF position or in the ON position, wherein the device is in the blocking position as standard.
Figure 4A:
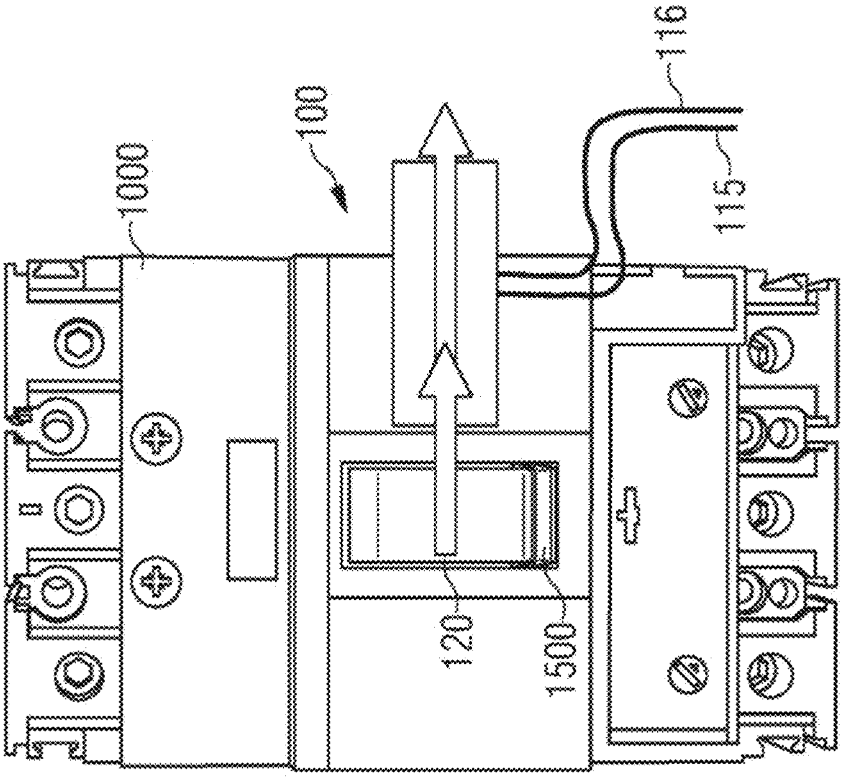

FIG. 4A shows a device 100 for locking an electrical switch 1000 with an ON state and an OFF state for opening or closing an electrical circuit. The electrical switch 1000 comprises a switching mechanism 1500 for changing from the ON state to the OFF state and vice versa.

FIG. 4A shows a handle as part of the switching mechanism 1500. The electrical switch 1000 can be switched from the OFF position, as is shown in FIG. 4A, to the ON position, as is shown in FIG. 4B, and vice versa by means of this handle 1500. The device 100 is in the blocking position as standard in the illustrations of FIGS. 4A and 4B in order to block the switching mechanism 1500, as a result of which the electrical switch 1000 is locked.

The device 100 can be moved into a release position in order to release the switching mechanism 1500. A change in the state of the electrical switch 1000 is possible in this way. In the illustration of FIGS. 4A and 4B, this means that a locking element 120 is moved to the right and it thus releases the movement path of the handle 1500.

Figure 5:
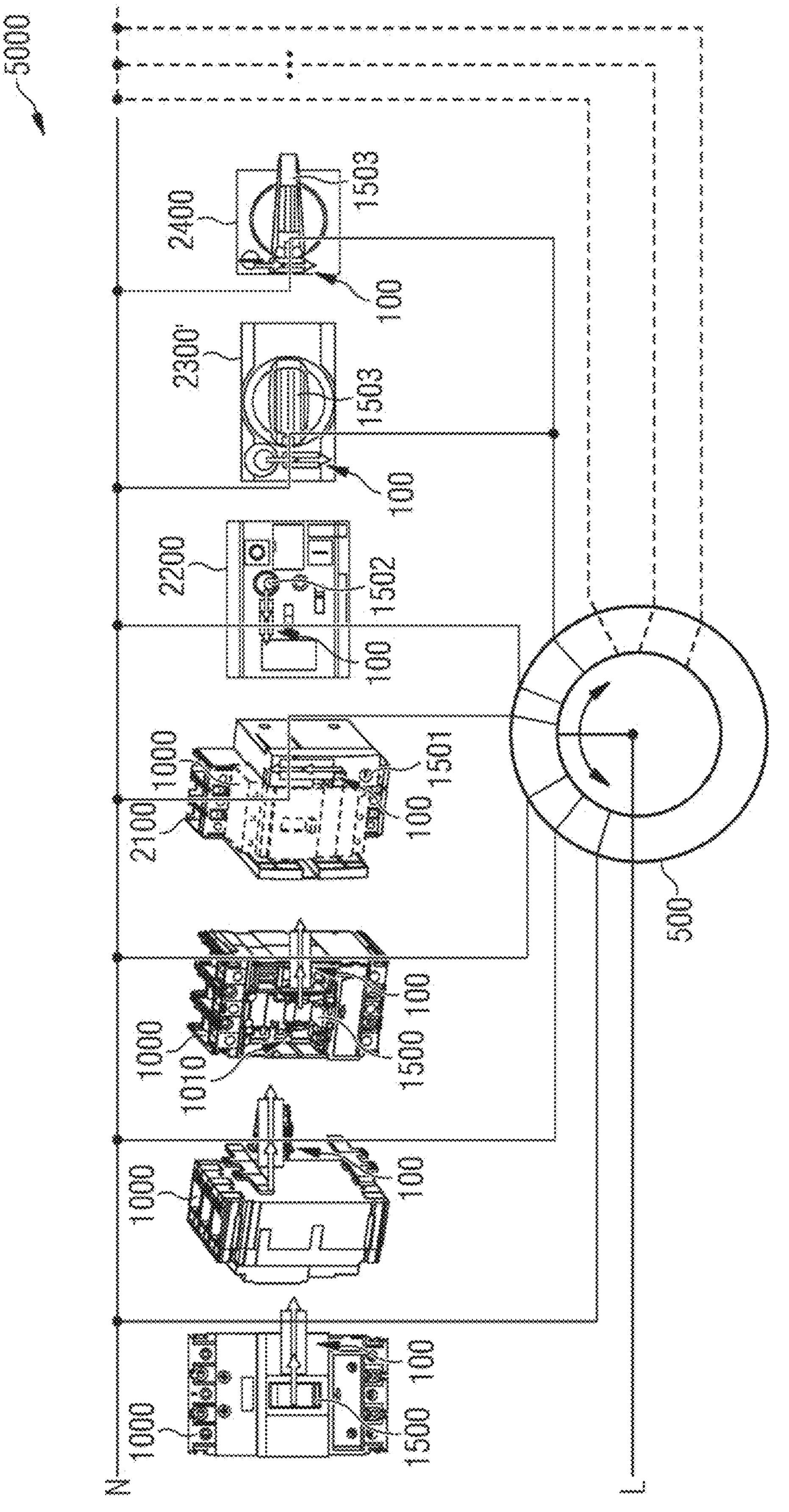
FIG. 5: shows a system for locking different assemblies.

FIG. 5 shows a system 5000 for locking different assemblies 1500; 1501; 1502; 1503. This system 5000 comprises at least two devices 100; 100; 100$^{I}$; 100$^{II}$; 100$^{III}$; 100$^{IV}$; 100$^{V}$; 100$^{VI}$ according to the invention and one control unit 500. The control unit 500 is designed to actuate the actuators 110 of the devices 100; 100$^{I}$; 100$^{II}$; 100$^{III}$; 100$^{IV}$; 100$^{V}$; 100$^{VI}$ and to block or release the assemblies 1500, 1501; 1502; 1503 in this way.

In accordance with the illustration in FIG. 5, the assemblies 1500, 1501; 1502; 1503 can belong to different devices, such as for example

- to an electrical switch 1000 for blocking a handle 1500,
- to an electrical switch 1000 with a rear-side locking arrangement by a device 100 according to the invention,
- to an electrical switch 1000 having an internally mounted device 100 for locking a latching mechanism 1500;
- to a device 100 for locking a crank drive 1501 inside an insert 2100 for an electrical switch 1000,
- to a device 100 for locking or releasing a drive 1502 inside a motor drive 2200,
- to a device 100 for locking or releasing a rotary handle 1503 inside a rotary drive 2300 or inside a further rotary drive 2300', or
- to a device 100 for locking or releasing a rotary handle 1503 of a door coupling rotary drive 2400.

Figure 6:
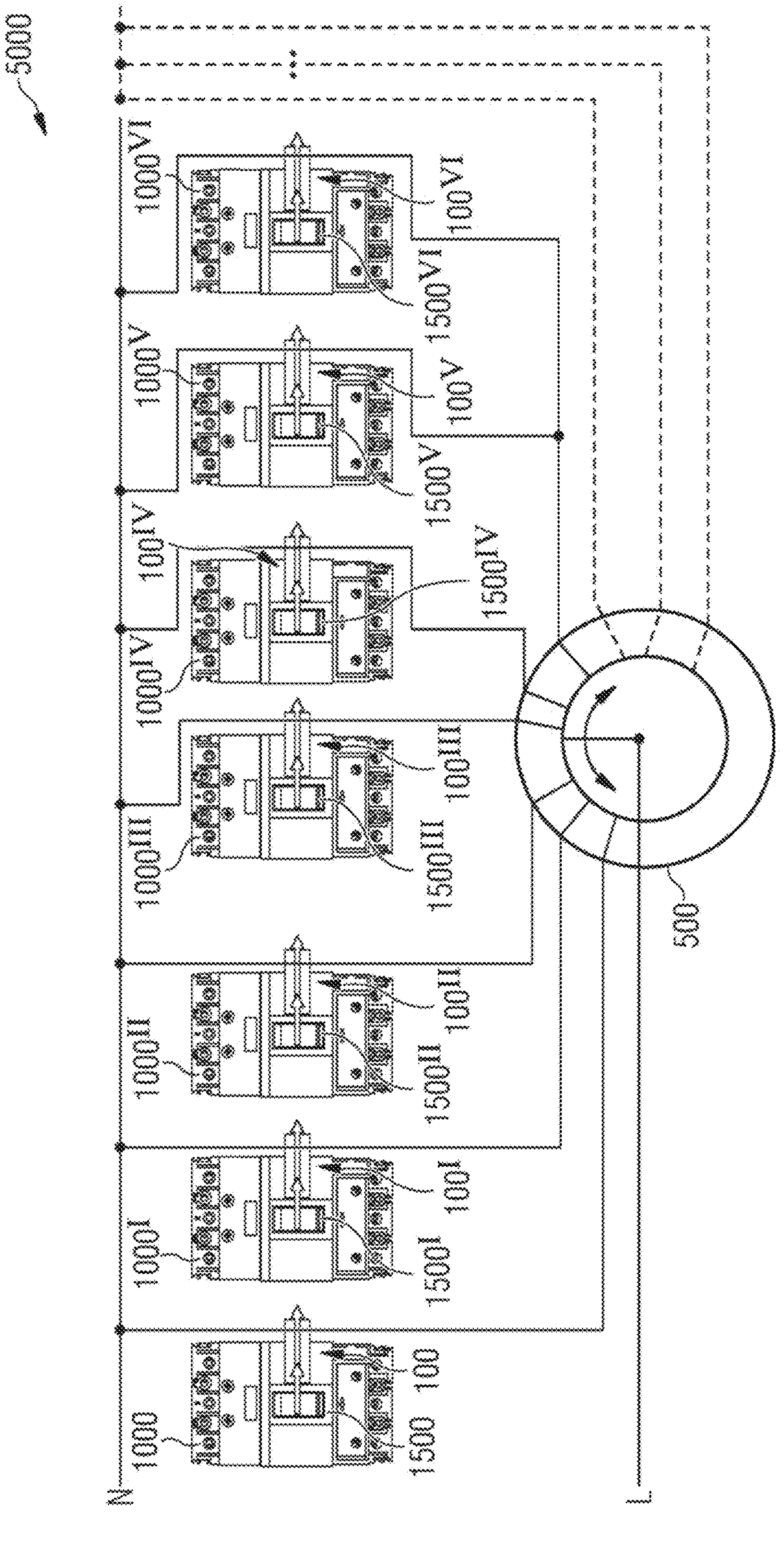
FIG. 6: shows a system for locking different assemblies of the same type.

FIG. 6 shows the system 5000 according to the invention, in which the different assemblies 1500; 1501; 1502; 1503 are of the same type. The embodiment in FIG. 6 concerns devices 100; 100$^{I}$; 100$^{II}$; 100$^{III}$; 100$^{IV}$; 100$^{V}$; 100$^{VI}$ for releasing or locking handles 1500; 1500$^{I}$; 1500$^{II}$; 1500$^{III}$; 1500$^{IV}$; 1500$^{V}$; 1500$^{VI}$ of electrical switches 1000; 1000$^{I}$; 1000$^{II}$; 1000$^{III}$; 1000$^{IV}$; 1000$^{V}$; 1000$^{VI}$.

The system 5000 can be designed such that in each case only one of the at least two devices 100; 100$^{I}$; 100$^{II}$; 100$^{III}$; 100$^{IV}$; 100$^{V}$; 100$^{VI}$ can be released and at the same time the rest of the devices 100; 100$^{I}$; 100$^{II}$; 100$^{III}$; 100$^{IV}$; 100$^{V}$; 100$^{VI}$ are blocked. This ensures that only one handle 1500; 1500$^{I}$; 1500$^{II}$; 1500$^{III}$; 1500$^{IV}$; 1500$^{V}$; 1500$^{VI}$ can be operated and all of the other handles are blocked.

The control unit 500 in accordance with the exemplary embodiments illustrated in FIGS. 5 and 6 can be designed as selector switches. It is likewise conceivable for the control unit 500 to be designed as an electronic controller. This electronic controller can be operated remotely for example, and this can be done, for example, from a remote control center by which the assemblies distributed throughout the world can be blocked or released.

The invention claimed is:

1. A device for locking an assembly, the device comprising:

an actuator having a first shape and a second shape both being semicircular;

a locking element being linearly movable;

said actuator, in said first shape, moving said locking element into a blocking position in order to block the assembly; and said actuator, in said second shape, moving said locking element into a release position in order to release the assembly.

2. The device according to claim 1, wherein said actuator is a shape-memory alloy actuator.

3. The device according to claim 1, wherein the device locks an internal or an external assembly of an electrical switch.

4. The device according to claim 1, wherein the device locks an assembly being a handle of an electrical switch, a switching shaft of an electrical switch, a latching mechanism inside an electrical switch, a crank drive inside an insert for an electrical switch, a drive inside a motor drive or a rotary handle inside a rotary drive or inside a door coupling rotary drive.

5. The device according to claim 1, which further comprises connection cables, said connection cables:

energizing said actuator in said first shape, and not energizing said actuator in said second shape, or not energizing said actuator in said first shape, and energizing said actuator in said second shape.

6. A system for locking different assemblies, the system comprising:

at least two devices according to claim 1 and a control unit;

said actuators of said devices being actuated by said control unit for blocking or releasing the assemblies.

7. The system according to claim 6, wherein said control unit releases only one of said at least two devices and simultaneously blocks a remainder of said at least two devices.

8. The system according to claim 6, wherein said control unit is a selector switch.

9. The system according to claim 6, wherein the different assemblies are of the same type, and said at least two devices lock the different assemblies.

10. The system according to claim 9, wherein the different assemblies are handles of electrical switches, and said at least two devices lock the different assemblies.

11. The system according to claim 6, wherein said control unit is an electronic controller.

12. The system according to claim 11, wherein said electronic controller is configured to be operated remotely.

13. A device for locking an assembly, the device comprising:

an actuator having a first shape and a second shape both being semicircular;

a locking element;

said actuator, in said first shape, moving said locking element into a blocking position in order to block the assembly;

said actuator, in said second shape, moving said locking element into a release position in order to release the assembly; and a guide, said locking element being a locking pin mounted in said guide and movable between the blocking position and the release position.

14. The device according to claim 13, wherein said locking pin performs a linear movement in said guide between the blocking position being an extended position of said locking pin and the release position being a retracted position of said locking pin.

15. The device according to claim 13, which further comprises a spring having a spring force, said locking pin being moved against the spring force of said spring by said actuator.

* * * * *